United States Patent
Kalbassi et al.

(10) Patent No.: US 9,795,915 B2
(45) Date of Patent: Oct. 24, 2017

(54) HEATER ARRANGEMENT FOR TEPSA SYSTEM

(71) Applicant: Air Products and Chemicals, Inc., Allentown, PA (US)

(72) Inventors: Mohammad Ali Kalbassi, Weybridge (GB); April Emma Louise O'Meara, Walton-on-Thames (GB); Christopher James Raiswell, Crewe (GB); Ian Robert Zone, Addlestone (GB)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 15/010,129

(22) Filed: Jan. 29, 2016

(65) Prior Publication Data

US 2017/0216761 A1   Aug. 3, 2017

(51) Int. Cl.
*B01D 53/047* (2006.01)
*B01D 53/04* (2006.01)

(52) U.S. Cl.
CPC ....... *B01D 53/0438* (2013.01); *B01D 53/047* (2013.01); *B01D 53/0462* (2013.01); *B01D 2257/504* (2013.01); *B01D 2257/80* (2013.01); *B01D 2259/402* (2013.01); *B01D 2259/40045* (2013.01)

(58) Field of Classification Search
CPC ............ B01D 53/0438; B01D 53/0462; B01D 53/047; B01D 2257/504; B01D 2257/80; B01D 2259/4045; B01D 2259/402
USPC ............... 95/96, 97, 99, 104, 106, 115, 148; 96/121, 126, 132
See application file for complete search history.

(56) References Cited

U.S. PATENT DOCUMENTS

| | | | | |
|---|---|---|---|---|
| 4,233,038 | A * | 11/1980 | Tao | B01D 53/04 95/104 |
| 4,409,006 | A * | 10/1983 | Mattia | B01D 53/06 95/113 |
| 5,614,000 | A * | 3/1997 | Kalbassi | B01D 53/0462 95/106 |
| 5,669,962 | A * | 9/1997 | Dunne | B01D 53/261 95/115 |
| 7,066,986 | B2 | 6/2006 | Haben et al. | |
| 8,734,571 | B2 | 5/2014 | Golden et al. | |
| 9,108,145 | B2 | 8/2015 | Kalbassi et al. | |
| 2010/0024641 | A1* | 2/2010 | Monereau | B01D 53/04 95/93 |
| 2011/0271833 | A1* | 11/2011 | Tentarelli | B01D 53/0462 95/104 |

(Continued)

FOREIGN PATENT DOCUMENTS

| | | |
|---|---|---|
| EP | 1284405 | 2/2003 |
| FR | 2825291 | 12/2002 |
| JP | S60139311 | 7/1985 |

*Primary Examiner* — Frank Lawrence
(74) *Attorney, Agent, or Firm* — Eric J. Schaal; Bryan C. Hoke, Jr.

(57) ABSTRACT

The present invention relates to a temperature enhanced pressure swing adsorption (TEPSA) process for removing at least two components including a less strongly adsorbed component and a more strongly adsorbed component from a gas mixture, said process comprising using one single heater and at least two adsorber vessels, in each of which repeated cycles comprising an adsorption phase and subsequent regeneration phases.

11 Claims, 11 Drawing Sheets

(56) References Cited

U.S. PATENT DOCUMENTS

2012/0011887 A1* 1/2012 Nakamura ......... B01D 53/0462
62/640

* cited by examiner

Figure 1 – Prior Art

HEATER ARRANGEMENT FOR TEPSA SYSTEM

The present invention relates to a Thermally Enhanced Pressure Swing Adsorption (TEPSA) process for pre-purification of air prior to cryogenic distillation, applying a single heater and at least two adsorber vessels. The invention further relates to an apparatus for use in such TEPSA process.

BACKGROUND OF THE INVENTION

It is regularly necessary to remove gas components from a gas stream by adsorption on a solid adsorbent. In particular, pre-purifying steps are commonly used when performing cryogenic air separation processes. Thereby, periodic regeneration of the adsorbent is necessary as such removed gas components may be of intrinsic value or they may be contaminating gas components in the gas mixture.

In such processes the gas is conventionally fed in contact with a solid adsorbent contained in an adsorber vessel to adsorb the component or components to be removed and these gradually build-up in the adsorbent. The concentration of the removed component or components in the adsorbent gradually rises and if the process is continued for a sufficient period, the adsorbed components will break through the downstream end of the adsorbent bed. Before this occurs, it is necessary to regenerate the adsorbent.

For performing pre-purifying steps different processes such as Thermal Swing Adsorption (TSA), Pressure Swing Adsorption (PSA) and Thermally Enhanced Pressure Swing Adsoprtion (TEPSA) are applied.

In a PSA process the desorption is done by stopping the flow into the adsorbent of gas to be treated, depressurizing the adsorbent and, usually, by passing a flow of regenerating gas low in its content of the component adsorbed on the bed through the bed counter-current to the product feed direction.

The TSA process is commonly used to pre-purify air upstream of a cryogenic air separation unit (ASU). The TSA process is characterized by high temperature regeneration of the adsorption process, typically well above 100° C., and a long hot regeneration period. Since the heat flux associated with TSA processes is intense and lengthy, degradation in heat pulse quality has minimal impact on the TSA desorption process. The heat provided to a TSA process, by the heater, is primarily used to desorb the strongly adsorbed component, namely water, which has high heat of adsorption.

A variant of the TSA process is the TEPSA process described for example in U.S. Pat. No. 5,614,000. TEPSA is a low temperature regeneration process with temperatures typically below 100° C. and only with short heating. Contrary to the TSA process, the heat provided by a heater is used to remove the "least strongly" adsorbed contaminates, namely $CO_2$. The heat flux associated with TEPSA processes can be described as weak, so even small heat losses on its journey towards the adsorbent bed can immensely degrade the quality of the heat carried by the heat pulse.

This is in contrast to the conventional TSA processes being dominated by high temperatures for regeneration of well above 100° C. and periods of hot regeneration of well above 10 minutes. Due to the more drastic conditions of TSA processes the position of the heater within reasonable distance (e.g. 20 m or more away from the adsorber vessel) has only little influence on the regeneration process, c.f. U.S. Pat. No. 9,108,145.

In U.S. Pat. No. 5,614,000 as well as U.S. Pat. No. 8,734,571 an apparatus configuration for TEPSA is described including only a single external heater for providing hot regeneration gas. Such a configuration, only including one external heater not being located in close proximity to the adsorbent vessels, has the disadvantage that heat losses occur easily, thereby degrading the quality of the heat pulse (which ideally has rectangular shape), sent to the adsorbent bed immensely.

This is the reason why in the practise of TEPSA processes so far such a configuration has not been applied, but rather configurations such as described in U.S. Pat. No. 7,066,986 are used. In this document, a two bed heater arrangement for TEPSA processes is disclosed wherein every adsorbent vessel has a separate heater. The heaters are arranged in a way that every adsorbent vessel is equipped with a separate heater element being located in the inlet nozzle of the adsorber vessel. By such a TEPSA arrangement described above disadvantages such as heat loss, varying quality of the heat pulse etc. can be minimized. Besides, the distance between the heater and the adsorbent bed is minimised, maintaining the quality of the heat pulse prior to contact with the adsorbent bed.

The problem with a heater arrangement as described by U.S. Pat. No. 7,066,986 is that multiple heaters have to be used, that is, one for each adsorbent vessel. Such an arrangement causes increased maintenance efforts due to the fact that a multitude of heaters is necessary and that these heaters have to be positioned in close contact with the adsorbent vessel. Furthermore, due to the fact that the heaters are contained in the inlet nozzles of the adsorbent vessels they hinder the implementation of more complicated vessel arrangements due to their bulkiness. In addition, a multitude of heaters has cost adverse effects due to an increase in material and energetic input. Furthermore, maintenance costs are also higher.

Thus, there is the need of an improved TEPSA process. The present invention aims to overcome the disadvantages of the TEPSA processes known in the art, and particularly aims to provide a process requiring a less complicated and expensive apparatus configuration which concurrently provides a stable heat pulse to the adsorbent bed(s).

Thus, the present invention aims to process intensification for operating low regeneration temperature TEPSA, related to the purification of air prior to cryogenic separation of air, to simplify and reduce the cost of the current process.

Moreover, the present invention relates to the provision of an apparatus which can be used for such TEPSA processes.

SUMMARY OF THE INVENTION

The present invention is based on the finding that above problems can be overcome by a TEPSA process using a single heater and at least two separate adsorbent vessels whereby the temperature difference between the highest and lowest temperature value during the first regeneration phase at the regeneration gas inlet of the adsorption vessel is 20° C. or lower.

The present invention therefore provides in a first aspect a temperature enhanced pressure swing adsorption (TEPSA) process for removing at least two components including a less strongly adsorbed component and a more strongly adsorbed component from a gas mixture, said process comprising using one single heater and at least two adsorber vessels, in each of which repeated cycles comprising an adsorption phase and subsequent regeneration phases are performed as follows:

in the adsorption phase said gas mixture is passed in a first direction through an adsorbent bed contained in the adsorber vessel, so that said gas mixture is purified by the adsorption of said at least two components in the adsorbent bed, in a first regeneration phase a hot regeneration gas having a target temperature which is selected to be any temperature in the range from 20° C. to 100° C., is passed through the adsorbent bed in a flow direction opposite to the flow direction during the adsorption phase, and in a second regeneration phase a cool regeneration gas having a target temperature which is selected to be any temperature in the range from 5° C. to 65° C. is passed through the adsorbent bed in a flow direction opposite to the flow direction during the adsorption phase, wherein the hot regeneration gas is provided to each of the adsorber vessels by passing regeneration gas from the source to said heater where it is heated up, and passing the hot regeneration gas leaving the heater to the respective vessel, and the cool regeneration gas is provided to each of the adsorber vessels by directing regeneration gas from the source to the respective vessel by-passing the heater, and the temperature difference between the highest and lowest temperature value during said first regeneration phase at the regeneration gas inlet of the adsorber vessel is 20° C. or lower.

The TEPSA process according to the invention has various advantages which are obtained by the specific configuration as described herein. The heat loss during regeneration phase is kept at a minimum and a stable and sharp (more rectangular shaped) heat pulse can be generated and passed over the adsorbent beds during the first regeneration phase. Besides, maintenance efforts can be reduced significantly as only one heater is necessary for the process, and energy reduction can be achieved making the process more economic and more sustainable.

Usually, the process of the invention is carried out so that in the different adsorbent beds alternatingly adsorption and regeneration is carried out, i.e. where two adsorbent vessels are used, in vessel 1 adsorption and simultaneously in vessel 2 regeneration take place.

In case more than two adsorbent beds are used, for example, three or four, still one single heater may be used for heating up the regeneration gas used in the first regeneration phase of each of the adsorbent vessels, as this phase is comparatively short in TEPSA processes so that heated gas may be alternatingly provided to each of the vessels.

In any case, it is important for the claimed process that the cool regeneration gas used in the second regeneration phase is not passed over a, possibly switched-off, heater but by-passes the heater.

In a second aspect the present invention provides a process according to the first aspect wherein the temperature difference between the highest and lowest temperature value during said first regeneration phase at the regeneration gas inlet of the adsorber vessel is 15° C. or lower.

In a third aspect, the present invention provides a process according to the previous aspects wherein the hot regeneration gas in the first regeneration phase has a target temperature which is selected to be any temperature in the range from 20° C. to 70° C.

In a fourth aspect, the present invention provides a process according to the preceding aspects, wherein the cool regeneration gas in the second regeneration phase has a target temperature which is selected to be any temperature in the range from 10° C. to 55° C.

In a fifth aspect the present invention provides a process according to the preceding aspects, wherein the difference of the target temperatures of the hot regeneration gas in the first regeneration phase and the cool regeneration gas in the second regeneration phase is 15° C. or more.

In sixth aspect, the present invention provides a process according to the preceding aspects, wherein the peak temperature of the hot regeneration gas in the first regeneration phase is 45° C. or more.

In an seventh aspect, the present invention provides a process according to the preceding aspects, wherein the first regeneration phase takes place for 20 min or less.

In an eighth aspect, the present invention provides a process according to the preceding aspects, wherein the second regeneration phase takes place for 80 min or less.

In a ninth aspect, the present invention provides a process according to the preceding aspects, wherein the overall regeneration cycle time (on-line time) is 120 min or less.

In a tenth aspect the present invention provides an apparatus for use in the TEPSA process according to any of the preceding aspects comprising one single heater and at least two adsorber vessels, wherein each adsorber vessel comprises an inlet for a gas mixture to be purified and an outlet for purified gas separated by a flow path including a flow chamber containing an adsorbent bed, an inlet and an outlet for regeneration gas separated by a flow path including said flow chamber, the apparatus further comprising lines connecting the source of the gas mixture to be purified with the inlets for the gas mixture of each adsorber vessel, a line connecting the heater with the source of regeneration gas, lines connecting the heater with the inlet for regeneration gas of each adsorber vessel, and lines connecting the source of the regeneration gas with the inlet of each absorber vessel which by-pass the heater, wherein hot regeneration gas is provided to each of the adsorber vessels during a first regeneration phase by passing regenerating gas from the source to the heater, heating it up, and passing the heated regeneration gas to the inlet of the respective adsorber vessel so that the temperature difference between the highest and lowest temperature value during said first regeneration phase at the regeneration gas inlet of the respective adsorber vessel is 20° C. or lower, and cool regeneration gas is provided to each of the adsorber vessels by directing regeneration gas from the source to the respective vessel by-passing the heater.

In an eleventh aspect the present invention provides an apparatus according to the tenth aspect, wherein a single line for heated regeneration gas leaves the heater which is split up into lines leading to each of the adsorber vessel inlets for regeneration gas individually.

In a twelfth aspect the present invention provides an apparatus according to the eleventh aspect, wherein the single line from the heater is joined with a single line from the regeneration gas source which has by-passed the heater to form a single, common regeneration gas line before this common line is split to lines leading to each of the adsorber vessels inlets for regeneration gas individually.

In a thirteenth aspect the present invention provides an apparatus according to the twelfth aspect, wherein the length X of the single line from the heater to the junction with the line by-passing the heater is between 1 m to 9 m.

In a fourteenth aspect the present invention provides an apparatus according to the twelfth or thirteenth aspect, wherein the length Y of the line between the junction of the single line from the heater with that by-passing the heater and the inlet for the regeneration gas of each adsorber vessel is not more than 6 m.

In a fifteenth aspect the present invention provides an apparatus according to the tenth to fourteenth aspect, wherein a single line from the regeneration gas source is split up to a line which leads to the heater and a line which by-passes the heater.

In a sixteenth aspect the present invention provides an apparatus according to the twelfth to fifteenth aspect, wherein the line along length X is insulated.

DETAILED DESCRIPTION

In the process of the invention, the repeated cycle of operation comprises an adsorption phase, during which a feed gas mixture stream in a feed direction at a first pressure and a first temperature in contact with a solid adsorbent capable of adsorbing a first component to be adsorbed more strongly and a second component to be adsorbed less strongly so that said first component is adsorbed in an upstream portion of said adsorbent and said second component is adsorbed principally in a more downstream portion of said adsorbent.

After the adsorption phase, the feed gas stream is halted and the gas in contact with the adsorbent is depressurized to a second, lower pressure.

After depressurization, the regeneration phases are carried out as described above. During the first regeneration phase, mainly the less strongly adsorbed component in the more downstream portion (relating to the flow of the gas mixture during the adsorption phase) is desorbed and in the second regeneration phase mainly the more strongly adsorbed second component in the upstream portion of the adsorbent is desorbed.

In the process according to the present invention the temperature difference between the highest and lowest temperature value during the first regeneration phase at the regeneration gas inlet of the adsorption vessel is 20° C. or lower. This is to ensure a high quality of the heat pulse during the first regeneration phase.

Preferably, said temperature difference is 18° C. or lower, more preferably 15° C. or lower, more preferably 13° C. or lower and most preferably 11° C. or lower.

Usually, the temperature difference between the highest and lowest temperature value during the first regeneration phase at the regeneration gas inlet of the adsorption vessel is 5° C. or higher.

This temperature difference is determined by continuously measuring the temperature at the regeneration gas inlet of the adsorption vessel during the entire first regeneration phase and subtracting the highest from the lowest measured temperature value.

Preferably, in the process according to the present invention the target temperature of the hot regeneration gas in the first regeneration phase is selected to be any temperature in the range from 20° C. to 90° C., preferably 20° C. to 80° C., more preferably 20° C. to 70° C., still more preferably 30° C. to 70° C., still more preferably 30° C. to 65° C. and most preferably 30° C. to 60° C.

In the process according to the invention the target temperature of the cool regeneration gas in the second regeneration phase is selected to be any temperature in the range from 10° C. to 65° C., preferably 15° C. to 65° C., more preferably 15° C. to 60° C. and most preferably 15° C. to 55° C.

The target temperature is the maximum temperature in a regeneration phase immediate to the adsorbent bed top surface.

Preferably, the difference of the target temperatures of the hot regeneration gas in the first regeneration phase and the cool regeneration gas in the second regeneration phase is 15° C. or more, more preferably is 20° C. or more.

The peak temperature, i.e. the highest measured temperature, of the hot regeneration gas at the regeneration gas inlet of the adsorber vessel in the first regeneration phase is 45° C. or more.

As mentioned, the period during which heated regeneration gas is passed over the adsorbent bed is rather short in TEPSA processes. Thus, in the process according to the present invention the first regeneration phase takes place for 30 min or less, preferably 25 min or less, preferably 20 min or less, more preferably 15 min or less, and most preferably 12 min or less.

Usually, the duration of the first regeneration phase is 5 min or more, preferably 10 min or more.

In the process according to the present invention the second regeneration phase preferably takes place for 90 min or less, preferably 80 min or less, more preferably 70 min or less, still more preferably 55 min or less, still more preferably 45 min or less, still more preferably 30 min or less, and most preferably 25 min or less.

Usually, the duration of the second regeneration phase is 5 min or more, preferably 10 min or more, and more preferably 15 min or more.

In the process according to the present invention the overall regeneration cycle time, i.e. including all regeneration phases (on-line time), is 120 min or less, preferably 105 min or less, more preferably 90 min or less, still more preferably 75 min or less, still more preferably 60 min or less, and most preferably 45 min or less.

Usually, the overall regeneration cycle time is 10 min or more, preferably 15 min or more, and more preferably 30 min or more.

Preferably, in the process of the invention the heater, and optionally also the downstream line with the "critical length X" as described below, are always kept warm. This is done to improve the heat pulse integrity during the first regeneration phase. Preferably the downstream line with the "critical length X" is insulated.

Preferably, in the process of the invention also the downstream line with the "length Y" as described below is insulated. This is done to improve the heat pulse integrity during the first regeneration phase. Insulation also serves personal protection.

Preferably, the temperature in the heater does not fall 20° C. or less, preferably 15° C. or less, more preferably 10° C. or less, and most preferably 5° C. or less below the target temperature of the first regeneration phase during the entire process. This may be achieved by appropriate means, such as switching off the heater only during short periods or not switching it off at all during the process, and/or by application of a line (normal piping) arrangement enabling the heater to remain at, or close to, normal operating temperature all the time.

Further preferred, the temperature in the downstream line with length X at the opposite end to the heater does not fall 25° C. or less, preferably 20° C. or less, more preferably 15°

C. or less, and most preferably 10° C. or less below the target temperature of the first regeneration phase during the entire process.

In a preferred embodiment, in the process of the invention the gas mixture to be purified is air.

Further preferred, the less strongly adsorbed component to be adsorbed from the gas mixture is carbon dioxide.

Preferably the $CO_2$ concentration in the gas mixture to be purified is from 50 to 2000 ppm, preferably from 100 to 1500 ppm, more preferably from 100 ppm to 1000 ppm, still more preferably from 200 to 800 ppm, and most preferably from 300 to 600 ppm.

The gas mixture to be purified may also contain $N_2O$, if present the concentration of $N_2O$ is from 100 to 1000 ppb, preferably from 100 to 900 ppb, more preferably from 200 to 700 ppb, and most preferably from 300 to 500 ppb.

Still further preferred, the more strongly adsorbed component to be adsorbed from the gas mixture is water.

In an embodiment of the invention, the flow of the gas mixture to be purified during the adsorption phase is from 250 to 200,000 $Nm^3\ hr^{-1}$, preferably is from 250 to 175,000 $Nm^3\ hr^{-1}$, more preferably from 250 to 125,000 $Nm^3\ hr^{-1}$, still more preferably from 350 to 100,000 $Nm^3\ hr^{-1}$, still more preferably from 350 to 50,000 $Nm^3\ hr^{-1}$, and most preferably from 500 to 20,000 $Nm^3\ hr^{-1}$. In a further embodiment, the flow of the regeneration gas during the first and/or second regeneration phase is from 250 to 150,000 $Nm^3\ hr^{-1}$, preferably is from 250 to 125,000 $Nm^3\ hr^{-1}$, still more preferably from 250 to 100,000 $Nm^3\ hr^{-1}$, still more preferably from 250 to 50,000 $Nm^3\ hr^{-1}$, still more preferably from 250 to 15,000 $Nm^3\ hr^{-1}$, and most preferably from 500 to 15,000 $Nm^3\ hr^{-1}$.

The purge/air ratio (P/A ratio) is from 0.1 to 0.9, preferably from 0.2 to 0.8, more preferably from 0.2 to 0.7, still more preferably from 0.25 to 0.6, and most preferably from 0.3 to 0.5.

The pressure of the gas mixture to be purified (the feed stream) is from 1 to 50 bara, preferably from 2 to 45 bara, still more preferably from 3 to 40 bara, still more preferably from 3.5 to 30 bara, still more preferably from 3.5 to 20 bara, and most preferably from 4 to 10 bara.

Further preferred embodiments of the process of the invention involve the use of the apparatus as described hereinbelow in any of the described embodiments.

In another aspect, the present invention provides an apparatus for use in the TEPSA process described in any of the above described embodiments comprising one single heater and at least two adsorber vessels, wherein each adsorber vessel comprises an inlet for a gas mixture to be purified and an outlet for purified gas separated by a flow path including a flow chamber containing an adsorbent bed, an inlet and an outlet for regeneration gas separated by a flow path including said flow chamber, the apparatus further comprising lines connecting the source of the gas mixture to be purified with the inlets for the gas mixture of each adsorber vessel, a line connecting the heater with the source of regeneration gas lines connecting the heater with the inlet for regeneration gas of each adsorber vessel, and lines connecting the source of the regeneration gas with the inlet of each absorber vessel which by-pass the heater, wherein hot regeneration gas is provided to each of the adsorber vessels during a first regeneration phase by passing regenerating gas from the source to the heater, heating it up, and passing the heated regeneration gas to the inlet of the respective adsorber vessel so that the temperature difference between the highest and lowest temperature value during said first regeneration phase at the regeneration gas inlet of the respective adsorber vessel is 20° C. or lower, and cool regeneration gas is provided to each of the adsorber vessels by directing regeneration gas from the source to the respective vessel by-passing the heater.

In a preferred embodiment of the apparatus according to the invention a single line for heated regeneration gas leaves the heater which is split up into lines leading to each of the adsorber vessel inlets for regeneration gas individually.

Further preferred, the single line from the heater is joined with a single line from the regeneration gas source which has by-passed the heater to form a single, common regeneration gas line before this common line is split to lines leading to each of the adsorber vessels inlets for regeneration gas individually.

In a particularly preferred embodiment of the invention, the length X of the single line from the heater to the junction with the line by-passing the heater is between 1 m to 9 m, preferably between 1 m to 6 m.

By keeping the "critical length X" of the line between the heater and the junction of the line from the heater with that of the line by-passing the heater between 1 m to 9 m, an especially sharp heat pulse can be provided to the adsorbent beds during the first regeneration phase.

As mentioned above, it is preferred that in the process of the invention the heater and possibly also the downstream line with the "critical length X" as described above are always kept warm. Therefore, it is preferred that the line along length X is insulated.

In a preferred embodiment of the apparatus of the invention a single line from the regeneration gas source is split up to a line which leads to the heater and a line which by-passes the heater.

In a preferred embodiment of the apparatus of the invention, the total length of the line between the junction of the single line from the heater with that by-passing the heater and the inlet for the regeneration gas of each adsorber vessel, "length Y", is not more than 6 m, more preferably is not more than 4 m, and most preferably is not more than 3 m.

The apparatus according to the invention has various advantages. The application of a single heater not being directly connected to or contained in the inlet nozzle of the adsorber vessel allows a more simple arrangement. Such a simple and more economic arrangement also allows more efficient maintenance thereby saving maintenance time and also maintenance costs. Furthermore, as the temperature of the heater will not reduce to ambient more square temperature profiles when the flow is rerouted over the heater and to the adsorbent vessels can be achieved with the inventive apparatus. The decline of the line temperature is decreased and, hence, sharper temperature profiles can be obtained through the inventive apparatus.

Figure 1:
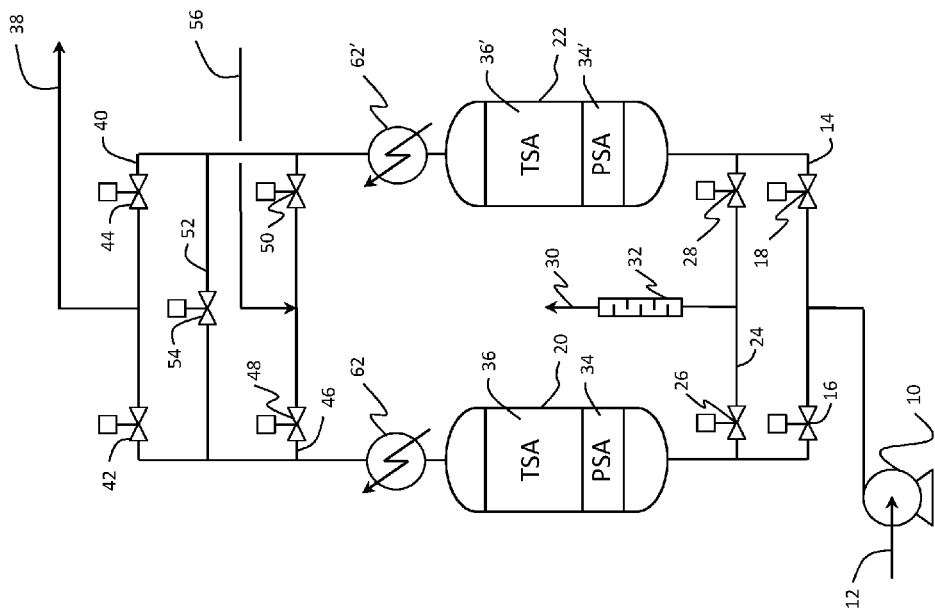
FIG. 1: Two adsorption vessel (2 bed) containing TEPSA arrangement with integrated heaters as known in the art.

The arrangement shown in FIG. 1 is a prior art setup for a TEPSA process how it is currently used in practise. As can be seen, not (only) one single heater for providing hot regeneration gas to the adsorbent beds is used, but in close proximity to the regeneration gas inlets of each of the adsorbent vessels an individual heater for the heating of the regeneration gas for each vessel is present.

Thus, in FIG. 1 two heaters 62, 62' are located in close proximity to each adsorbent vessel 20, 22. By that configuration, the integrity of the heat pulse to the adsorbent bed is ensured, however, the arrangement is complicated as every adsorbent vessel 20, 22 needs to be equipped with a separate heater which in turn means higher investment costs.

Figure 2:
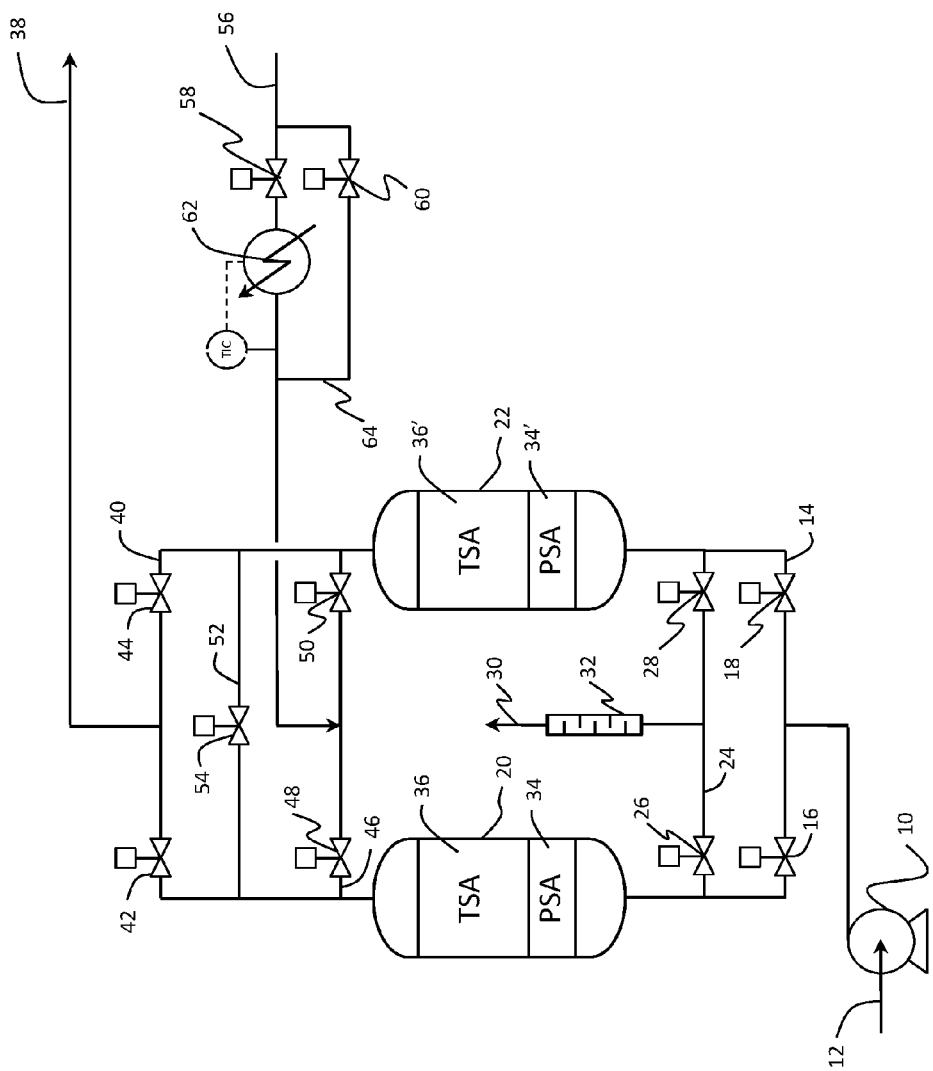
FIG. 2: Two adsorption vessel (2 bed) containing TEPSA configuration with external heater and by-pass line.
Figure 3:
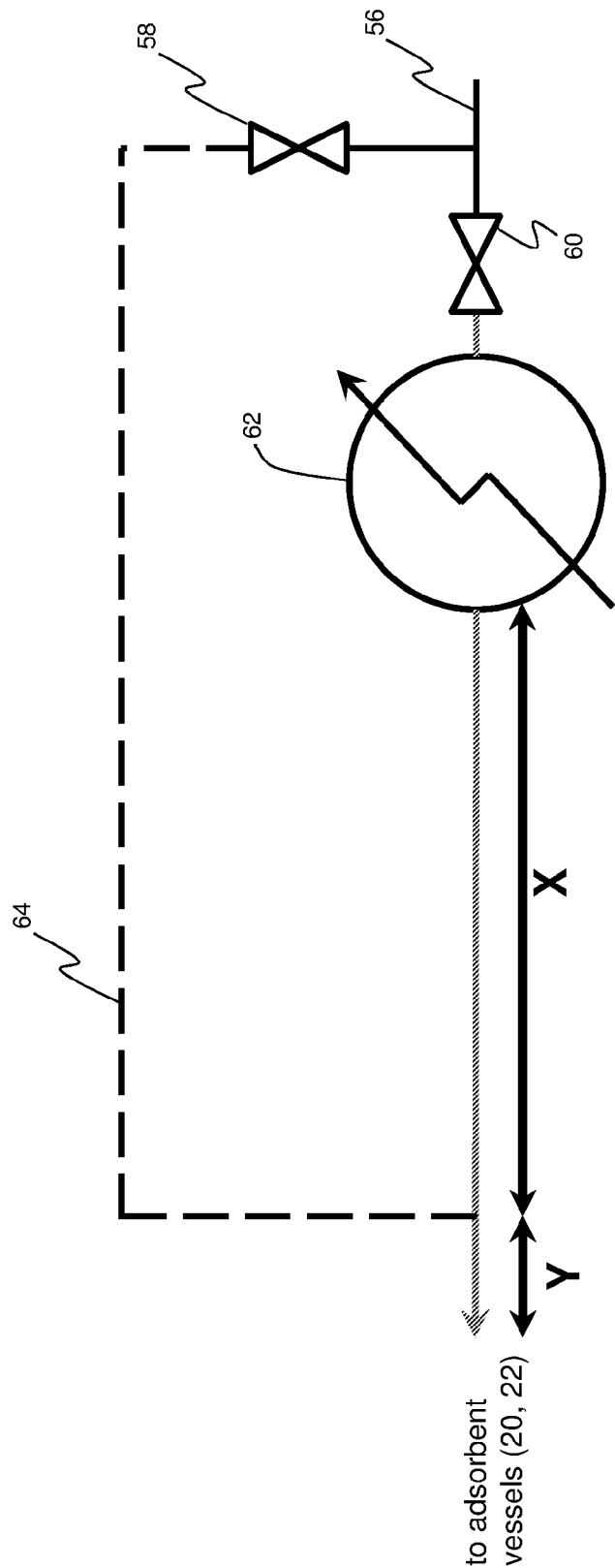
FIG. 3: Simplified "hot stand-by" heater arrangement with the depiction of the line length "X" (Distance X) and the line length "Y" (Distance Y)

FIG. 2 shows configuration which can be used in the present invention. Regeneration gas originates from the regeneration gas source. The single heater 62 is located in the regeneration gas line being isolated through two valves 58 and 60 which control the route of the regeneration gas. The regeneration gas can thereby either be directed through the heater 62 via open valve 60 or by-passing the heater with valve 60 closed and with valve 58 open. In a distance X, that is, the line exiting the heater in direction to the adsorber vessel (depicted as to "adsorbent vessels, 20, 22"; cf. FIG. 3) with the length X and the by-pass for cool regeneration gas controlled via valve 58 are joined. The line length X to said junction is depicted as distance X and is always kept warm, for example by means including insulation of said line. FIG. 3 depicts in addition the line length Y (Distance Y), whereby the regeneration gas inlet (only depicted as "to adsorbent vessels, 20, 22") is not shown. However, the line length Y is the distance between the junction of the line exiting the heater in direction to the adsorber vessel with the length X and the by-pass for cool regeneration gas controlled via valve 58 and the regeneration gas inlet of the adsorber vessels. It must be noted that the length Y is measured for each line leading from said junction to the respective adsorber vessel individually. The details of said "hot standby" heater arrangement are also shown in FIG. 3.

According to FIG. 2 air to be purified (the feed stream) is supplied to a main air compressor system 10 at an inlet 12 in which it is compressed by a multi-stage compressor with inter and after cooling by heat exchange with water. The cooled compressed air is supplied to an inlet manifold 14 containing inlet control valves 16 and 18 to which is connected a pair of adsorbent bed containing vessels 20 and 22. The inlet manifold is bridged downstream of the control valves 16 and 18 by a venting manifold 24 containing venting valves 26, 28 which serve to close and open connections between the upstream end of respective adsorbent vessels 20 and 22 and a vent 30 via a silencer 32. Each of the two adsorbent beds 20 and 22 contains at least two adsorbents. The feed end adsorbent is designated by the numeral 34, 34' in respective beds and the product end adsorbent by the numeral 36, 36'.

The apparatus has an outlet 38 connected to the downstream ends of the two adsorbent vessels 20, 22 by an outlet manifold 40 containing outlet control valves 42, 44.

The outlet manifold 40 is bridged by a regenerating gas manifold 46 containing regenerating gas control valves 48 and 50. Upstream from the regenerating gas manifold 46, a line 52 containing a control valve 54 also bridges across the outlet manifold 40. An inlet for regenerating gas is provided at 56 which through control valves 58 and 60 is connected to pass either through a heater 62 or via a by-pass line 64 to the regenerating gas manifold 46.

The operation of the valves may be controlled by suitable programmable timing and valve operating means as known in the art (not illustrated).

In operation air is compressed in the main air compressor system 10 and is fed to the inlet manifold 14 and passes through one of the two vessels containing adsorbent. Starting from a position in which air is passing through open valve 16 to adsorbent vessel 20, and through open valve 42 to the outlet 38, valve 18 in the inlet manifold will just have been closed to cut-off vessel 22 from the feed of air for purification. Valve 44 will just have closed also. At this stage valves 48, 50, 54, and 26 are closed. Bed 20 is thus on-line and bed 22 is to be regenerated.

To commence depressurisation of bed 22, valve 28 is opened and once the pressure in the vessel 22 has fallen to a desired level, valve 28 is kept open whilst valve 50 is opened to commence a flow of regenerating gas. The regenerating gas will typically be a flow of dry, $CO_2$-free nitrogen obtained from the air separation unit cold box, possibly containing small amounts of argon, oxygen and other gases, to which the air purified in the apparatus shown is passed. Valve 60 is closed and valve 58 is opened so that the regenerating gas is heated to a temperature of e.g. 70° C. before passing into the vessel 22. Although the regenerating gas enters the vessel 22 at the selected elevated temperature, it is very slightly cooled by giving up heat to desorb carbon dioxide from the upper, downstream adsorbent portion 36' in the vessel. Since the heat pulse is retained in the system, the exit purge gas emerges from the vent outlet 30 in a cooled state. Progressively, a heat wave moves through the upper adsorbent 36' as the carbon dioxide is cleared. After a desired period, whilst the heat pulse is part way through the upper adsorbent 36', valve 58 is closed and valve 60 is opened so that the flow of regenerating gas now becomes cool. The cooled regenerating gas displaces the heat pulse further through the upper adsorbent 36'.

Whilst the upper adsorbent has been thus regenerated by TSA, the cool regenerating gas has continued to flow through the lower adsorbent and by virtue of its reduced pressure has desorbed water and carbon dioxide from the upstream adsorbent by PSA. At the end of the allotted regeneration period, valve 50 may be closed to end the flow of regenerating gas and valve 54 may be opened to displace nitrogen from the adsorbent and, after the closing of valve 28, to repressurise the vessel 22 with purified air. Thereafter, valve 54 may be closed and valves 18 and 44 may be opened to put the vessel 22 back on line. Residual heat left in bed may be removed by the purified air as a temperature pulse which can be removed in a downstream heat exchanger. The vessel 20 may then be regenerated in a similar manner and the whole sequence continued with the vessels being on-line, depressurising, regenerating, repressurising, and going back on-line in phased cycles of operation.

In accordance with the invention, the heat pulse during regeneration does not penetrate as far as the boundary of the portion of the adsorbent into which water is adsorbed. This will lie somewhere within the region 34, 34' below the boundary with the region 36, 36' shown in the drawings. The actual proportions of the regions 34, 34' and 36, 36' are dependent on the operating conditions, e.g. feed pressure, feed temperature, cycle time and purge/air ratio.

Figure 4:
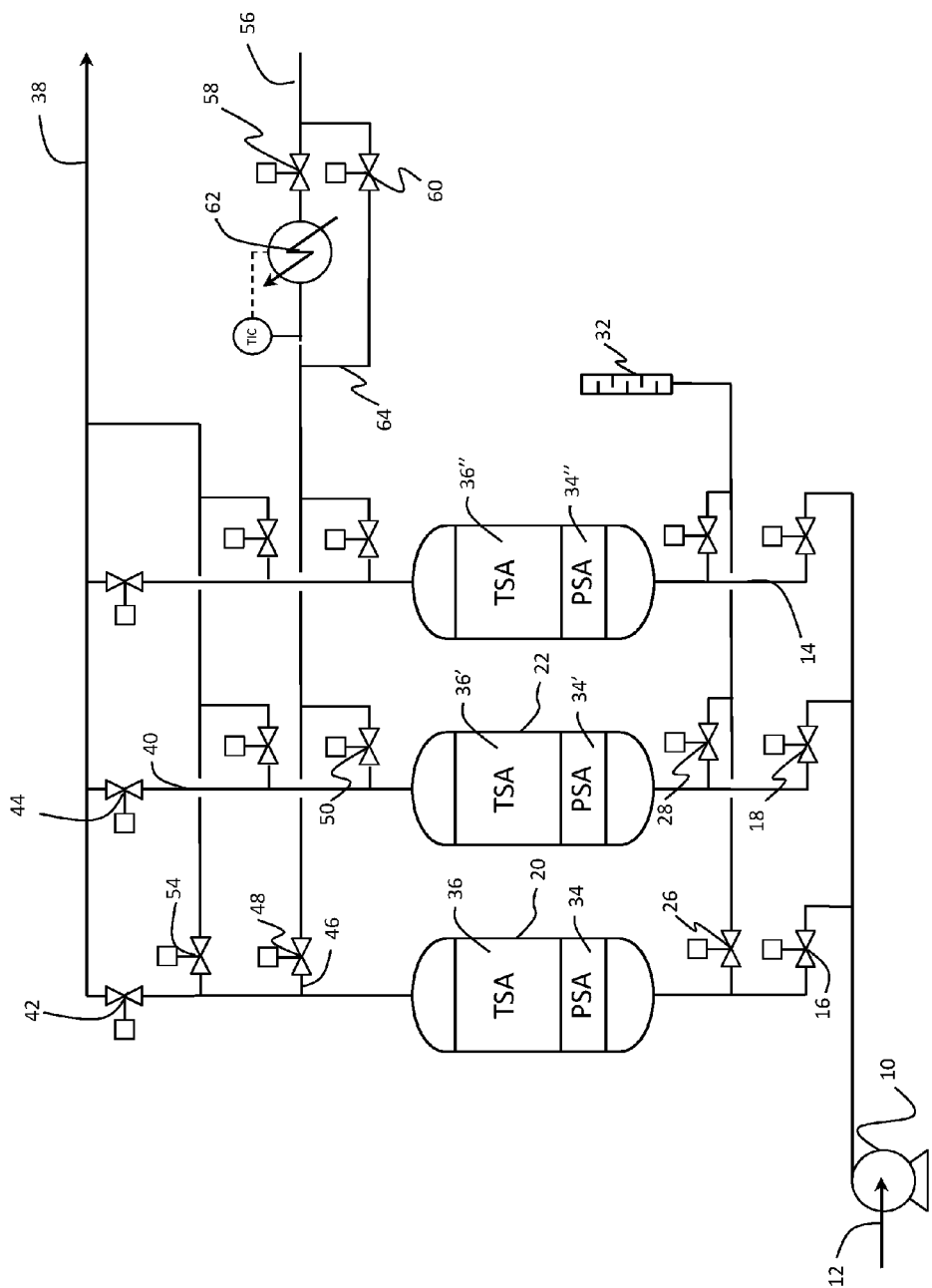
FIG. 4: Three adsorption vessel (3 bed) containing TEPSA arrangement with external heater and by-pass line.

FIG. 4 shows a three adsorbent vessel inventive solution for the "hot stand-by" application, whereby, instead of using three separate heaters, a single heater is installed and "shared" at a suitable position between the adsorber vessels. Such an arrangement brings much simplicity and is more sustainable as it also saves energy, maintenance time and can be run more efficiently.

EXAMPLES

Simulations were performed to test the integrity (shape) of the heat pulse sent to the adsorber vessels during the first regeneration phase in arrangements with and without "hot stand-by".

The test arrangement used for the experiments had a maximum available flow of 1500 $Nm^3\ hr^{-1}$. The pipes and heater duty were 4" and 24 kW, respectively.

The flow was measured upstream of the heater using an elbow flow meter and the pressure was measured upstream and downstream of the heater.

Thermocouples were placed:
a) upstream of the heater, to measure the temperature of the gas in order to measure the temperature increase across the heater;
b) at an ambient location, for heat loss calculations; and
c) at 0.2 m, 1 m, and then at 1 m intervals up to 9 m, allowing for simultaneous multiple temperature versus time curves at increasing distances away from the heater.

The air flow rate describes the feed flow rate of the feed stream to TEPSA vessels. As the experimental arrangement applied only modeled the heating of the regeneration gas the purge flow rate was used. Hence, in the following the air flow rate describes the purge flow rate. The purge flow rate remains the same for both heating and cooling steps. In the hot stand-by arrangement, the flow through the test arrangement is reduced to zero to mimic the stagnant gas in the heater.

$\Delta T$ is defined as the difference between the feed stream to TEPSA vessels temperature and the regeneration temperature at the top of the adsorbent bed. For all examples the required $\Delta T$ is 30°, therefore, the achieved $\Delta T$ during experiments must be at least 30° C. This means for all examples that the required $\Delta T$ of 30° C. is the minimum temperature increase in stream temperature which must be achieved to meet the regeneration requirements. This requirement is met by all examples.

Comparative Example 1 (CE1)

For Comparative Example 1 the conditions shown in Table 1 were applied.

TABLE 1

Experimental conditions for Comparative Examples 1 and 2.

| Example | Air Flow Rate $Nm^3hr^{-1}$ | Turn Down % | P/A | Purge Flow Rate $Nm^3 hr^{-1}$ | Pressure bar g | Power kW | Heating Flow Rate $Nm^3hr^{-1}$ | Heating Time min | Cooling Flow Rate $Nm^3hr^{-1}$ | Cooling Time min | Insulation % |
|---|---|---|---|---|---|---|---|---|---|---|---|
| CE 1 & CE 2 | 2600 | 100 | 0.5 | 1300 | 0.22 | 24 | 1300 | 10 | 1300 | 25 | 0 |

The arrangement "with hot stand-by heater" corresponds to that shown in FIG. 3. The experiments were performed in a TEPSA arrangement according to FIG. 2 whereby a "hot stand-by heater" corresponding to that of FIG. 3 was used. In the arrangement "without hot stand-by heater" all of the regeneration gas is passed through the heater, which accordingly must be switched off after the heating of the regeneration gas needed in the first regeneration phase and is switched on again only at the beginning of the next first regeneration phase to heat up regeneration gas to the desired temperature.

Besides, experiments were conducted with a "hot stand-by" heater arrangement with and without insulated piping.

Figure 5:
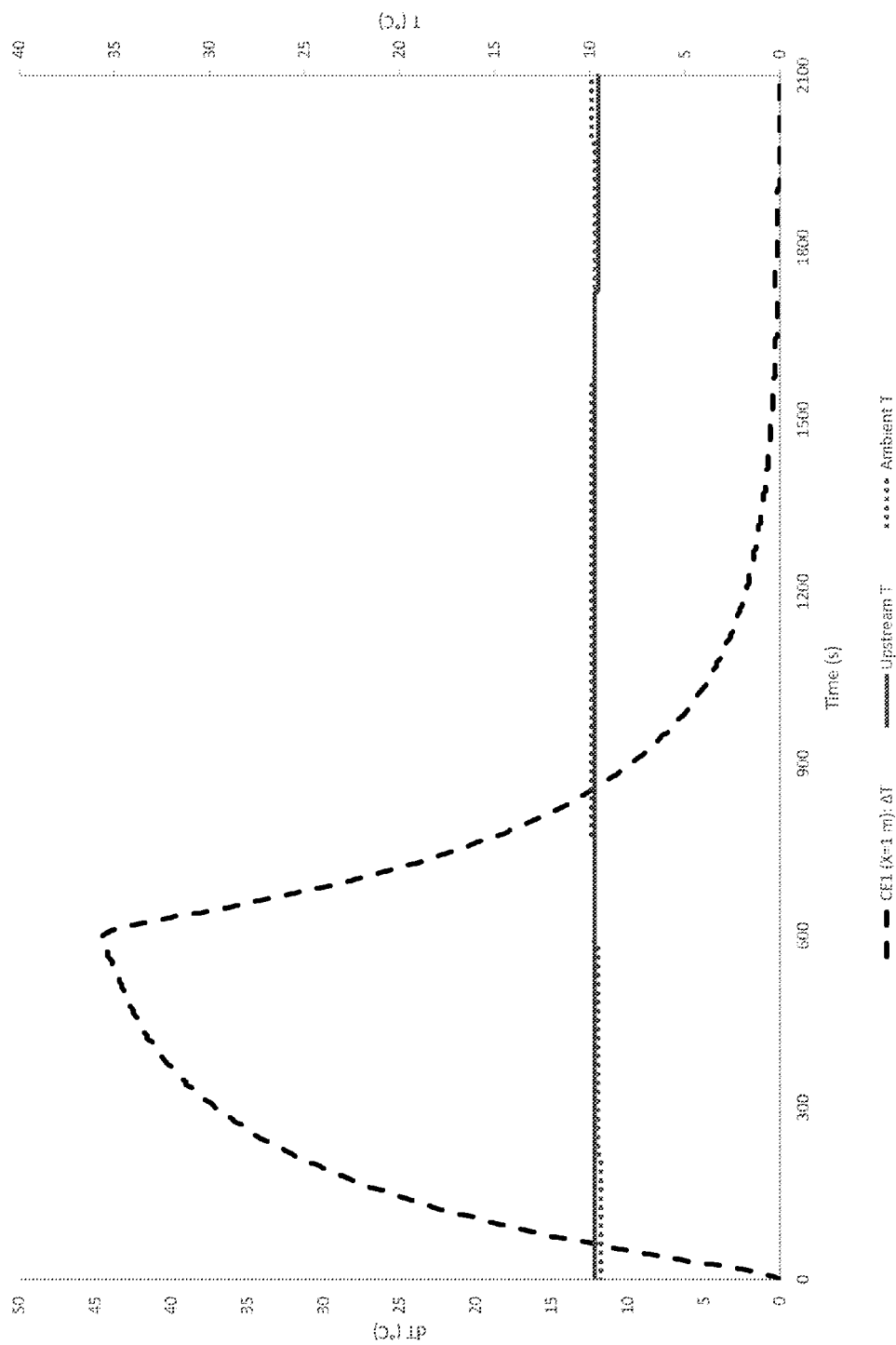
FIG. 5: Diagram showing the TEPSA regeneration stream temperature profile without a "hot stand-by" heater arrangement with X=1 m.

CE1, cf. diagram of FIG. 5, shows the temperature pulse progression exiting a heater from the cold position whereby no "hot stand-by" is applied. The heater is installed in the common line providing regeneration gas from a regeneration gas source to the TEPSA process. The heating time is 10 minutes. The temperature is measured at a distance of X=1 m downstream of the heater.

As it can be seen from FIG. 5, there is a slow progression of the temperature pulse rise. After the heater is switched off heat is still supplied to the adsorbent beds as the heater and associated pipes are cooled down by the gas that should now be the "cold" purge to the adsorbent beds.

Comparative Example 2 (CE2)

For Comparative Example 2 the test conditions and set up as used for CE1 were applied.

Figure 6:
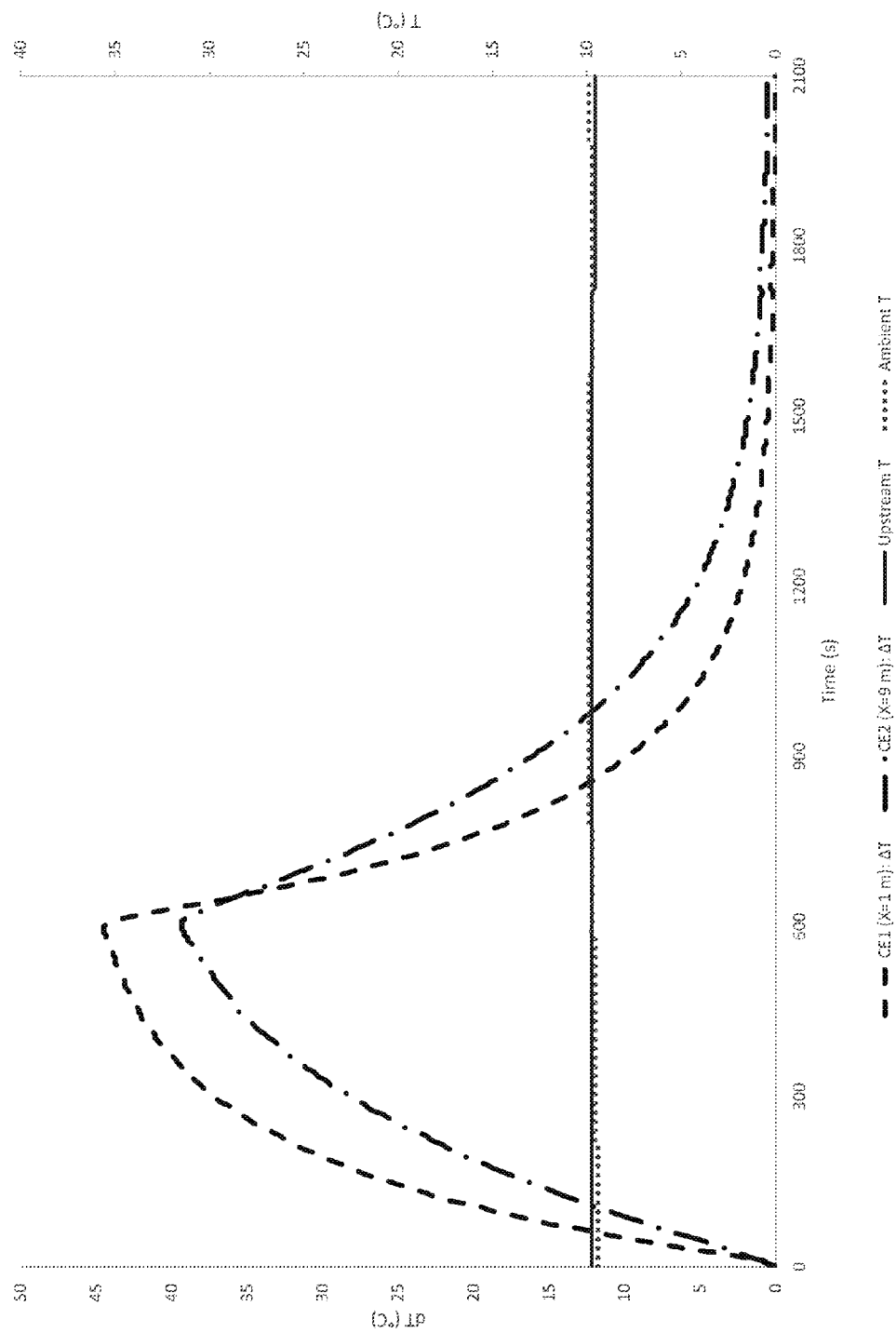
FIG. 6: Comparison of diagrams showing TEPSA regeneration stream temperature profiles without a "hot stand-by" heater arrangement with X=1 m and X=9 m.

However, the temperature was measured at a distance of X=9 m downstream of the heater. The results are shown in FIG. 6. In FIG. 6 the temperature profiles at a distance X=1 m for CE1 and at a distance X=9 m for CE2, respectively, are compared. It can be seen, that there is additional deterioration of the heat pulse the further the heater is located away from the adsorbent vessel. With increasing distance from the heater the stream temperature is slower to increase and the peak temperature (at 10 min) is lower.

The rate of decrease of the stream temperature during the cooling step is less at distances further away from the heater (cf. FIG. 6). The difference is such that for a short period of time after the heater being switched off, the stream temperature furthest from the heater is hotter than just after the heater. This difference can be as significant as 5° C., i.e. at a point in time during the cooling step. The stream temperature at 9 m was 5° C. hotter than the stream temperature at 1 m.

Inventive Example 1 (IE1)

For Inventive Example 1 the conditions shown in Table 2 have been applied.

TABLE 2

Experimental conditions for Inventive Example 1.

| Example | Air Flow Rate $Nm^3hr^{-1}$ | Turn Down % | P/A | Purge Flow Rate $Nm^3 hr^{-1}$ | Pressure bar g | Power kW | Heating Flow Rate $Nm^3hr^{-1}$ | Heating Time min | Cooling Flow Rate $Nm^3hr^{-1}$ | Cooling Time min | Insulation % |
|---|---|---|---|---|---|---|---|---|---|---|---|
| IE 1 | 2600 | 100 | 0.5 | 1300 | 0.22 | 24 | 1300 | 10 | 0 | 25 | 100 |

A "hot stand-by" set up for the heater was used and insulation has been applied. The insulation material applied is recycled fibre.

In the case of low and short temperature cycles (<70° C., <10 min) a large amount of the heat pulse degradation is caused by the thermal mass of the piping as well as the heater itself. So insulation is mainly useful for preventing heat loss to the environment, i.e. to prevent the "hot stand-by" parts cooling down when not in use. Besides, by keeping the heater on "hot stand-by" mode cooling down of the heater by cool regeneration gas is avoided.

The temperature was measured at a distance of X=1 m and X=9 m (Distance X) from the physical location of the heater. The downstream pipe was kept warm whilst the cold purge was directed through the by-pass by closing valve 58 and opening valve 60 (cf. FIG. 3).

Figure 7:
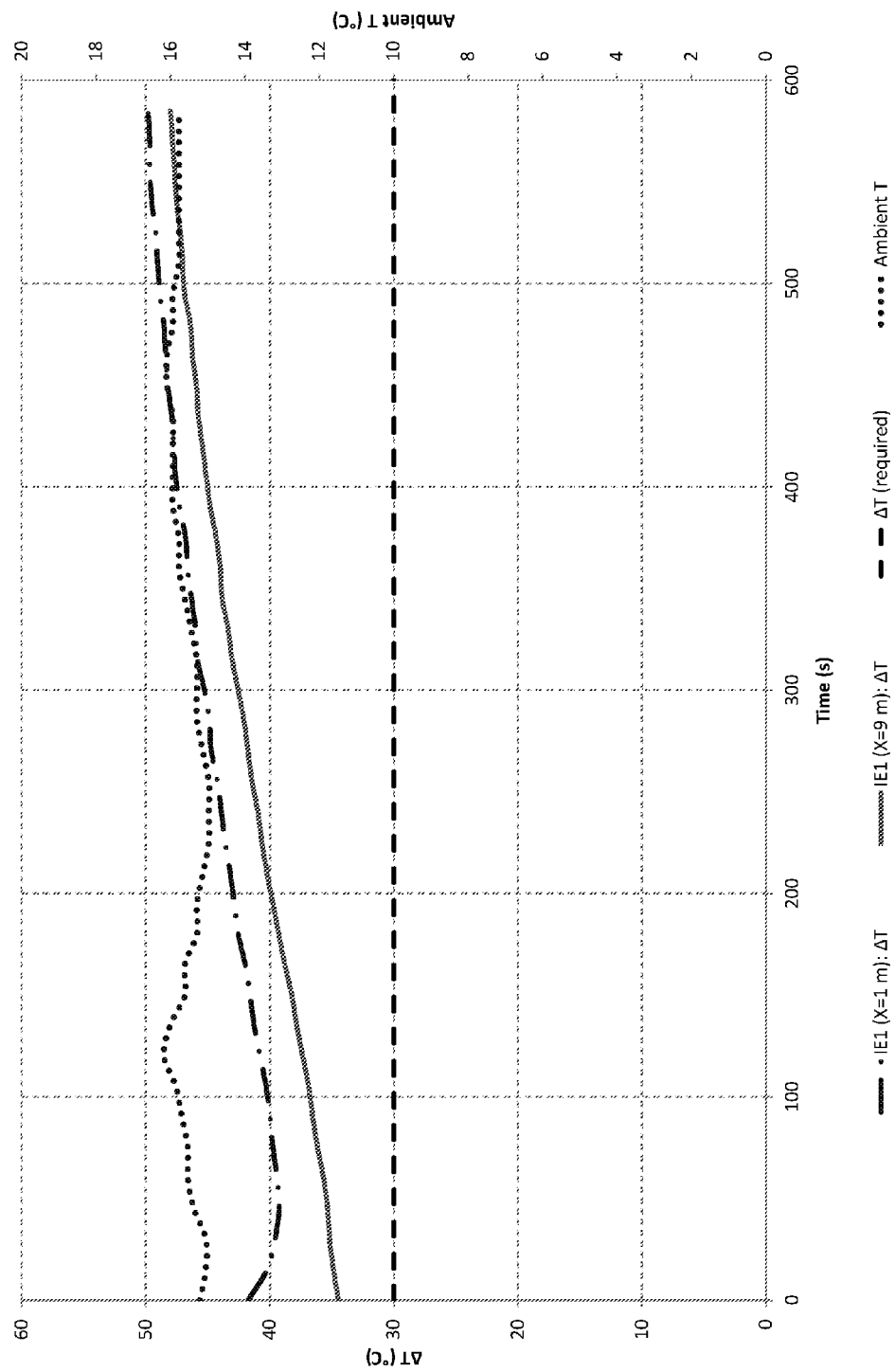
FIG. 7: Comparison of diagrams showing a "hot stand-by" regeneration and stand-by profile with insulation with X=9 m and a "hot stand-by" regeneration and stand-by profile with insulation with X=1 m.

FIG. 7 shows the temperature profiles of the measurements for IE1 with a hot stand-by arrangement with insulation with X=1 m and X=9 m. An additional deterioration of the heat pulse is observed the further the heater is located away from the adsorbent vessel.

Inventive Examples 2 (IE 2)

The experimental conditions applied for IE2 are depicted in Table 3 below.

TABLE 3

Experimental conditions for Inventive Examples 2.

| Example | Air Flow Rate $Nm^3hr^{-1}$ | Turn Down % | P/A | Purge Flow Rate $Nm^3hr^{-1}$ | Pressure bar g | Power kW | Heating Flow Rate $Nm^3hr^{-1}$ | Heating Time min | Cooling Flow Rate $Nm^3hr^{-1}$ | Cooling Time min | Insulation % |
|---|---|---|---|---|---|---|---|---|---|---|---|
| IE 2 | 2600 | 100 | 0.5 | 1300 | 0.22 | 24 | 1300 | 10 | 0 | 25 | 0 |

Figure 8:
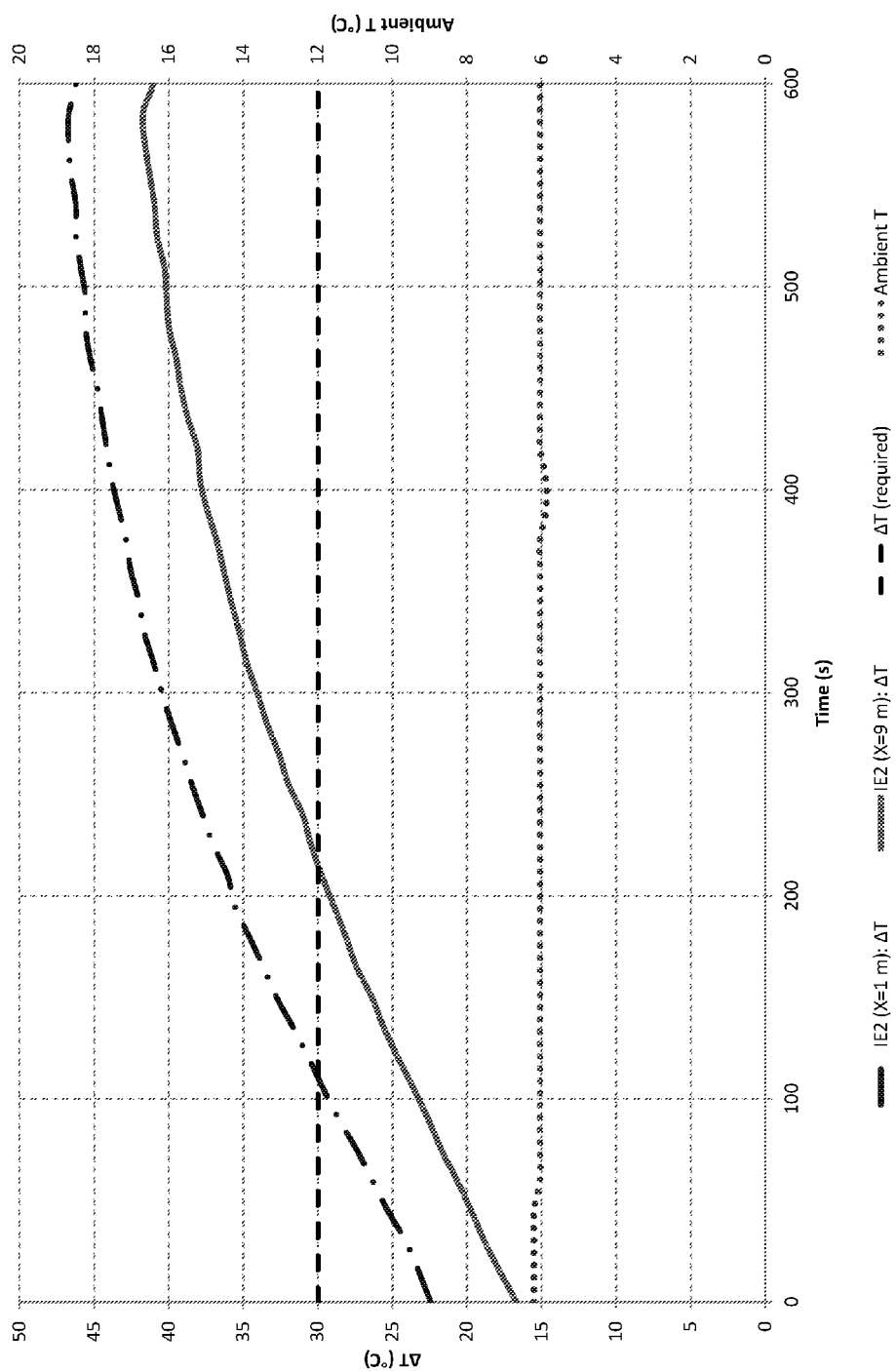
FIG. 8: Comparison of diagrams showing a "hot stand-by" regeneration and stand-by profile without insulation with X=9 m and a "hot stand-by" regeneration and stand-by profile without insulation with X=1 m.

In FIG. 8 the temperature profiles for the measurements of IE2 with a hot-standby arrangement without insulation with X=1 m and X=9 m are shown. As can clearly be seen there is additional deterioration of the heat pulse the further the heater is located away from the adsorbent vessel. This finding is in line with the finding of non "hot stand-by" arrangements as already shown in FIG. 6.

Furthermore, from FIG. 8 can be derived that the peak temperatures for IE2 with X=1 m and X=9 m are lower compared to IE1. This can be traced back to the missing insulation.

In the following the results for 30° C. Temperature Increase Times for CE1 and CE2 as well as IE 2 are listed in Table 4 below.

TABLE 4

30° C. Temperature Increase Times for CE1, CE2 and IE 2.

| | Distance (X = 1 m) | | Distance (X = 9 m) | |
|---|---|---|---|---|
| Example | ΔT Rise Time, (s) | Percent of Maximum Time | ΔT Rise Time, (s) | Percent of Maximum Time |
| CE1 | 195 | 32.5% | — | — |
| CE2 | — | — | 330 | 55.0% |
| IE2 | 120 | 20.0% | 225 | 37.5% |

From table 4 can be derived that the distance X has an important impact on the Temperature Increase Time as is clearly shown by the differing values for the ΔT Rise Time with respect to CE1, CE2 and IE2. Besides, it is also shown that a "hot stand-by" arrangement decreases the ΔT Rise Time significantly.

In Table 5 the results of the measurements regarding the hot stand-by effect with and without insulation with X=1 m are shown. The Temperature Peak and the ΔT Rise Time of CE1 as well as IE1 and IE2 are compared. The conclusions are provided in Table 5.

TABLE 5

Results on hot stand-by effect.
Observation (at X = 1 m), comparing arrangement without hot stand-by, CE1 with hot standby arrangements of IE1 & IE2)

| Temperature Peak | ΔT Rise Time |
| --- | --- |
| CE1 lower than IE1 | CE1 longer than IE1 |
| CE1 lower IE2 | CE1 longer than IE2 |
| IE2 lower than IE1 | IE2 longer than IE1 |
| Conclusion | Conclusion |
| Operating with hot stand-by and cold bypass increases temperature peak whereby hot stand-by with insulation increases the temperature peak further | Operating with hot stand-by and cold bypass reduces time to reach stream ΔT. |

Figure 9:
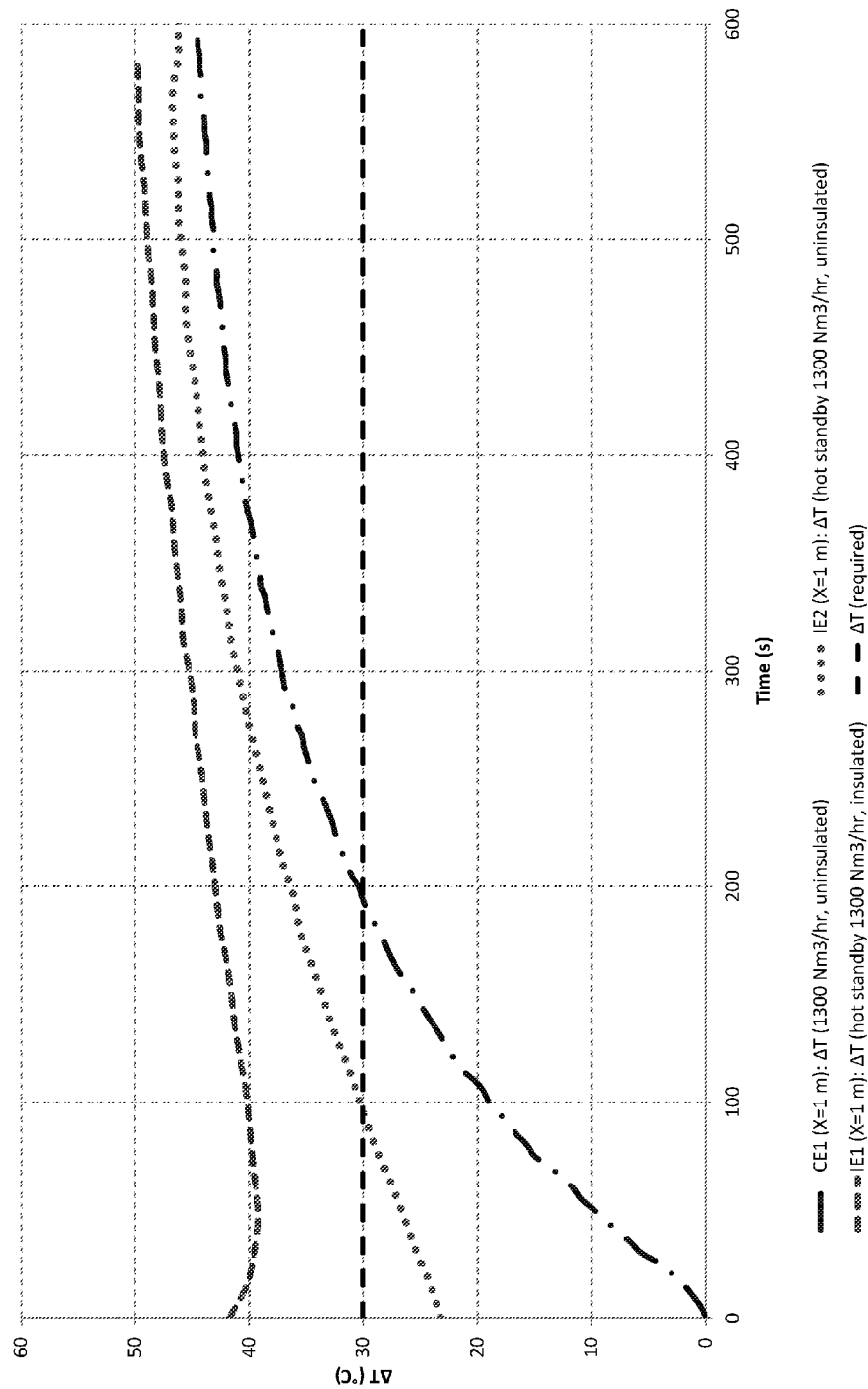
FIG. 9: Comparison of diagrams showing a "hot stand-by" regeneration and stand-by profile with insulation with X=1 m, a "hot stand-by" regeneration and stand-by profile without insulation with X=1 m and a regeneration stream temperature profile without a "hot stand-by" heater arrangement and without insulation with X=1 m.

FIG. 9 depicts the temperature profiles of CE1, IE1 and IE for a distance of X=1 m.

The comparison of the Inventive Examples with the Comparative Example, clearly shows that the hot stand-by mode and hot stand-by with insulation have improved the temperature peak and rise time.

Figure 10:
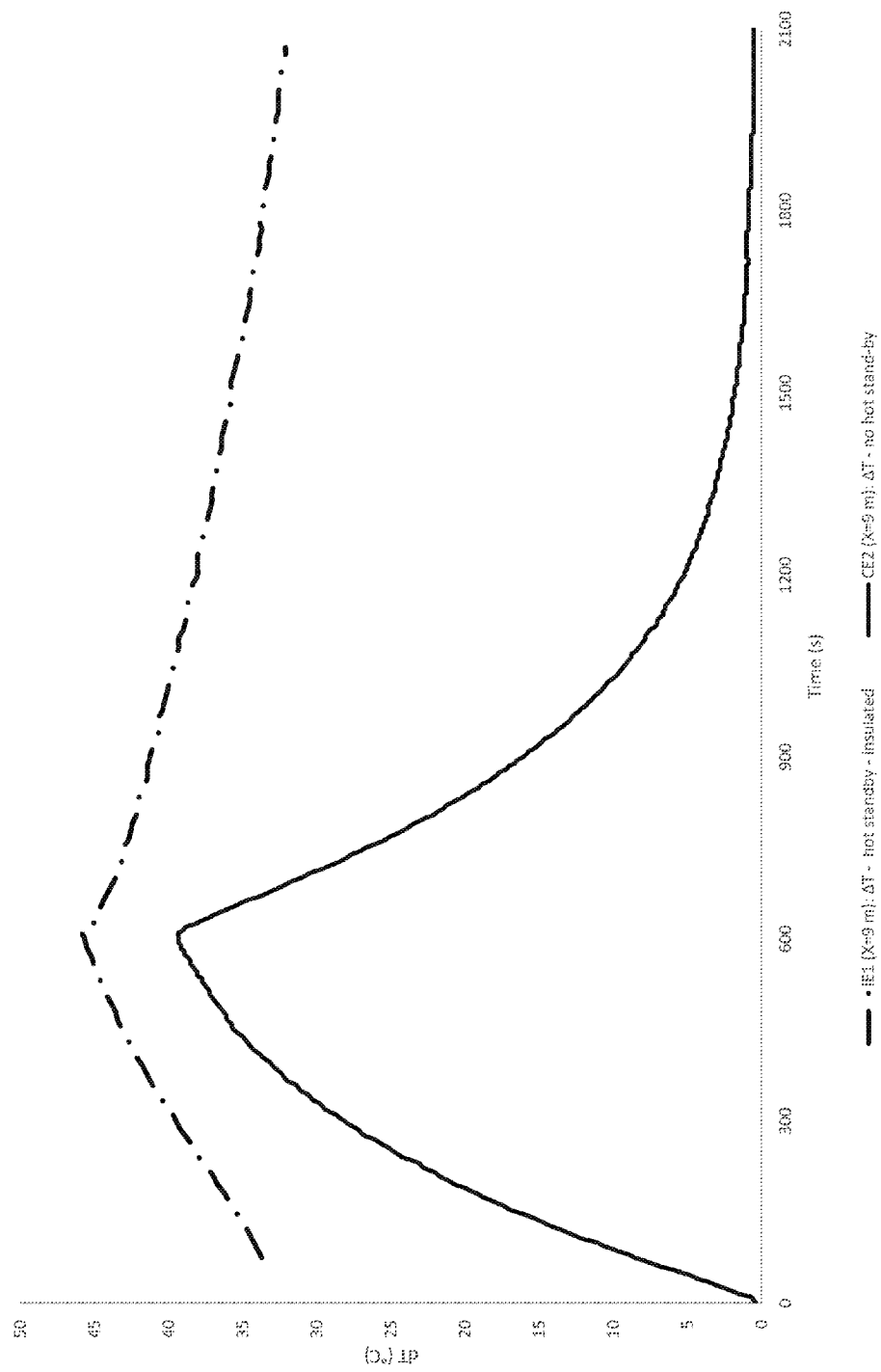
FIG. 10: Comparison of diagrams showing a "hot stand-by" regeneration profile with X=9 m with insulation versus the regeneration stream temperature profile without a "hot stand-by" heater arrangement with X=9 m.
Figure 11:
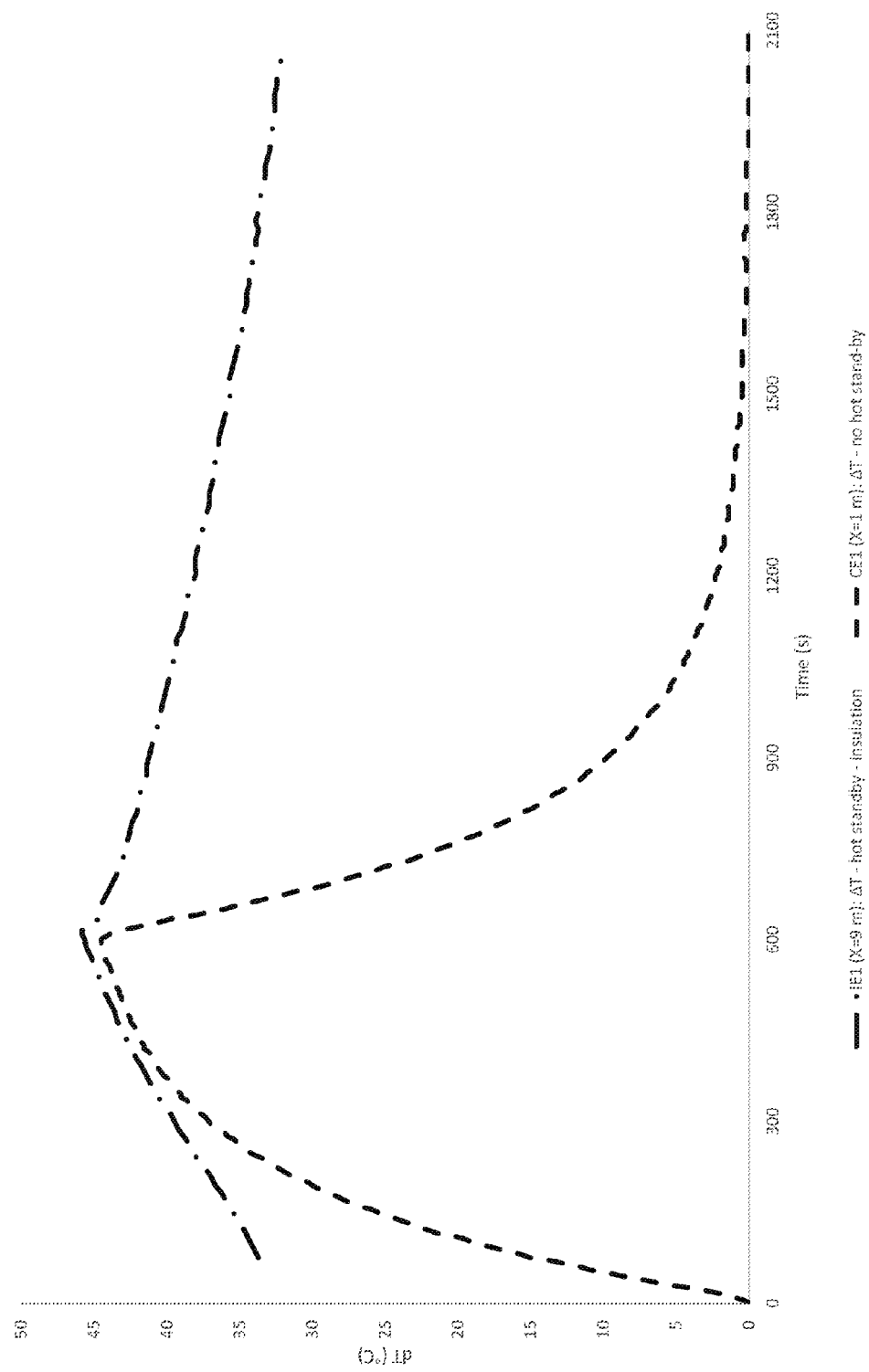
FIG. 11: Comparison of diagrams showing a "hot stand-by" regeneration profile with X=9 m with insulation versus the regeneration stream temperature profile without a "hot stand-by" heater arrangement with X=1 m.

FIGS. 10 and 11 provide comparisons of the temperature profiles obtained for IE1 for X=9 m with the results obtained for CE1, cf. FIG. 11, and CE2, cf. FIG. 10.

FIG. 11 depicts the temperature profiles of CE1 (X=1 m) and IE1 (X=9 m).

As can clearly be seen for IE1 when comparing it to CE1 the temperature drop at the start of the heating process immediately exiting the heater, i.e. the difference between the highest and lowest temperature value during said first regeneration phase is reduced from 45° C. to about 12° C. A similar effect is shown in comparison to CE2. Thus, the conditions and arrangement applied for IE1 allow a much more significant quantity of high grade heat to be introduced to the TEPSA process. Besides, higher peak temperatures can be obtained. Furthermore, less energy is necessary to reach the peak temperature as the difference between the highest and lowest temperature value during the first regeneration phase is significantly reduced.

In Table 6 the results of the measurements for CE1 with X=1 m and IE1 with X=9 m are shown (temperature curves are depicted in FIG. 11). The Temperature Peak and the ΔT Rise Time of CE1 and IE1 are compared. The conclusions are provided in Table 6 below.

TABLE 6

Comparison on hot stand-by effect with insulation and without hot stand-by and insulation at varying length X.
Comparing X = 1 m (arrangement without hot stand-by, CE1) versus X = 9 m (hot standby arrangement, IE1)

| Temperature Peak | ΔT Rise Time |
| --- | --- |
| CE1 lower than IE1 | CE1 longer than IE1 |
| Conclusion | Conclusion |
| Operating with hot stand-by and cold bypass increases temperature peak even at a length of X = 9 m. | Operating with hot stand-by and cold bypass reduces time to reach stream ΔT. |

As can be derived from FIG. 11 and Table 6, in case of hot stand-by with insulation, IE1 (cf. respective upper dash-and-dot curves), the temperature peak and the ΔT Rise Time are improved even if the length X is extended from X=1 m (CE1) to X=9 m (IE1). The comparison of CE2 (X=9 m) with IE1 (X=9 m) as depicted in FIG. 10 shows an even stronger difference between the inventive hot stand-by arrangement with insulation and a conventional set up.

While the principles of the invention have been described above in connection with preferred embodiments, it is to be clearly understood that this description is made only by way of example and not as a limitation of the scope of the invention.

The invention claimed is:

1. Apparatus for use in a temperature enhanced pressure swing adsorption (TEPSA) process, the apparatus comprising one single heater and at least two adsorber vessels, wherein each adsorber vessel comprises
    an inlet for a gas mixture to be purified and an outlet for purified gas separated by a flow path including a flow chamber containing an adsorbent bed,
    an inlet and an outlet for regeneration gas separated by a flow path including said flow chamber,
the apparatus further comprising
    lines connecting a source of the gas mixture to be purified with the inlets for the gas mixture of each adsorber vessel,
    a line connecting the one single heater with a source of regeneration gas,
    lines connecting the one single heater with the inlet for regeneration gas of each adsorber vessel, and
    a by-pass line for connecting the source of regeneration gas with the inlet of each absorber vessel for regeneration gas, where said by-pass line by-passes the one single heater,
wherein a single line from the one single heater is joined at a junction with the by-pass line, the junction feeding a single, common regeneration gas line before this common regeneration gas line is split to individual lines leading to each inlet for regeneration gas of each respective adsorber vessel; and
wherein the length, X, of the single line from the one single heater to the junction with the by-pass line is between 1 m and 9 m.

2. An apparatus according to claim 1, wherein the total length, Y of the line between the junction and the inlet for the regeneration gas of each adsorber vessel is not more than 6 m.

3. An apparatus according to claim 1, wherein the single line from the one single heater to the junction with the by-pass line is insulated.

4. A temperature enhanced pressure swing adsorption (TEPSA) process using the apparatus according to claim 1, the process for removing at least two components including a less strongly adsorbed component and a more strongly adsorbed component from the gas mixture, wherein repeated cycles comprising an adsorption phase and subsequent regeneration phases are performed in each of the adsorber vessels as follows:
    in the adsorption phase said gas mixture is passed in a first direction through the adsorbent bed contained in the adsorber vessel, so that said gas mixture is purified by the adsorption of said at least two components in the adsorbent bed,
    in a first regeneration phase a hot regeneration gas having a target temperature which is selected to be any temperature in the range from 20° C. to 100° C., is passed through the adsorbent bed in a flow direction opposite to the flow direction during the adsorption phase, and in a second regeneration phase a cool regeneration gas having a target temperature which is selected to be any temperature in the range from 5° C. to 65° C. is passed through the adsorbent bed in a flow direction opposite to the flow direction during the adsorption phase, wherein the hot regeneration gas is provided to each of the adsorber vessels by passing regeneration gas from the source of the regeneration gas to said one single heater where the regeneration gas is heated up, and passing the hot regeneration gas leaving the one single heater to the respective vessel through the single line from the one single heater to the junction having a length, X, between 1 m and 9 m, and the cool regeneration gas is provided to each of the adsorber vessels by directing regeneration gas from the source of the regeneration gas to the respective vessel by-passing the one single heater.

5. A process according to claim 4, wherein the hot regeneration gas in the first regeneration phase has a target temperature which is selected to be any temperature in the range from 20° C. to 70° C.

6. A process according to claim 4, wherein the cool regeneration gas in the second regeneration phase has a target temperature which is selected to be any temperature in the range from 10° C. to 55° C.

7. A process according to claim 4, wherein the difference of the target temperatures of the hot regeneration gas in the first regeneration phase and the cool regeneration gas in the second regeneration phase is 15° C. or more.

8. A process according to claim 4, wherein the peak temperature of the hot regeneration gas in the first regeneration phase is 45° C. or more.

9. A process according to claim 4, wherein the first regeneration phase takes place for 20 min or less.

10. A process according to claim 4, wherein the second regeneration phase takes place for 80 min or less.

11. A process according to claim 4, wherein the overall regeneration cycle time (on-line time) is 120 min or less.

* * * * *